(No Model.)
J. J. HAYES & O. S. FELCH.
FRICTION CLUTCH.
No. 431,209. Patented July 1, 1890.
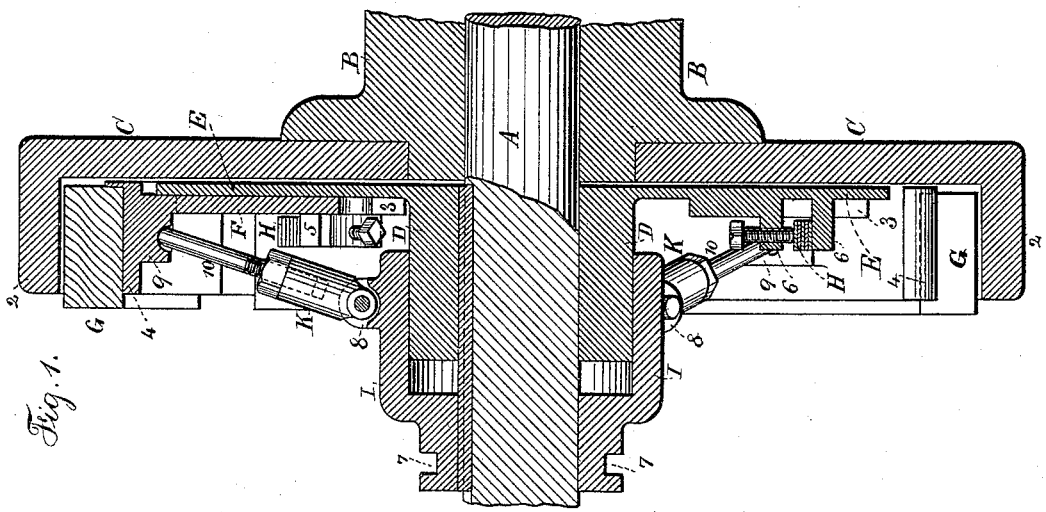
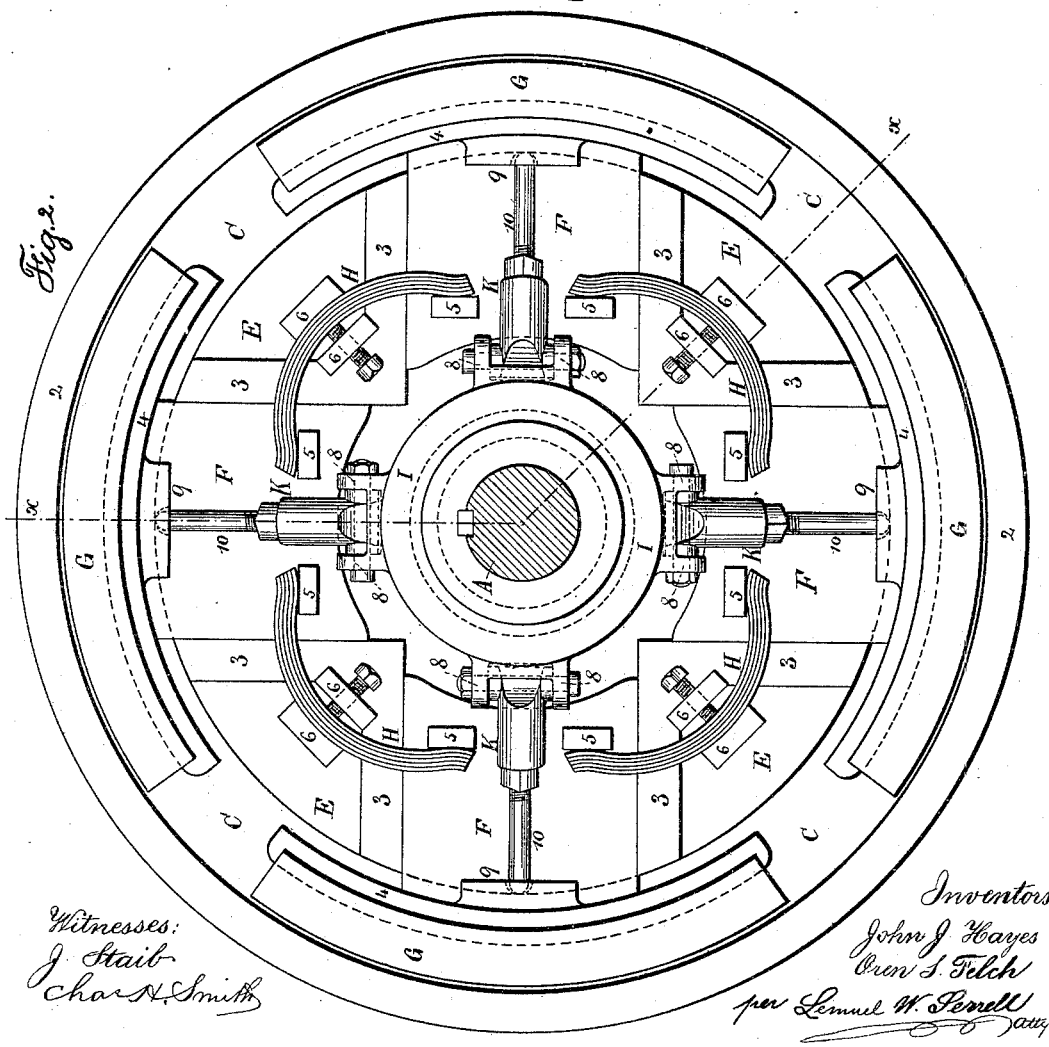
Witnesses:
J. Staib
Chas. H. Smith
Inventors
John J. Hayes
Oren S. Felch
per Lemuel W. Serrell
atty

UNITED STATES PATENT OFFICE.

JOHN J. HAYES AND OREN S. FELCH, OF BROOKLYN, NEW YORK.

FRICTION-CLUTCH.

SPECIFICATION forming part of Letters Patent No. 431,209, dated July 1, 1890.

Application filed November 4, 1889. Serial No. 329,188. (No model.)

*To all whom it may concern:*

Be it known that we, JOHN J. HAYES and OREN S. FELCH, citizens of the United States, residing at Brooklyn, in the county of Kings and State of New York, have invented an Improvement in Friction-Clutches, of which the following is a specification.

Friction-clutches and pulleys have been made in which a friction-clutch has been expanded outwardly within a cylindrical rim forming the edge of the wheel or pulley, and in clutches of this character helical springs have been made use of for drawing the shoes or blocks out of contact with the ring; but in consequence of the centrifugal force due to the rapid revolution of the parts these helical springs are not reliable, and they are not easily adjusted to adapt the friction-clutch to different speeds of revolution.

In our present improvements we make use of flat bow-springs supported in the middle and the ends resting upon the sliding stocks of the friction-clutches, and the clamp for holding the bow-springs is adapted to a greater or less number of such springs, so that they can be readily increased in strength to adapt the clutch to the rapid revolution to which it may be exposed.

In the drawings, Figure 1 is a vertical section of the clutch upon a shaft at the line $xx$, Fig. 2; and Fig. 2 is a face view of such clutch.

The shaft A is supported in suitable bearings and has upon it a fixed sleeve and collar B, and around the same is a loose wheel C, having a cylindrical rim 2, and there is a hub D around the shaft A to confine the central portion of the wheel C to its proper position, and from this hub D extends the disk E, that is within the loose wheel C, and is provided with guide-ribs 3 for the sliding stocks F, that are formed at their outer ends with segmental receivers 4 for the friction blocks or shoes G. These friction blocks or shoes are made of lignum-vitæ and bolted into the segmental receivers 4, and upon each of the sliding stocks F there are two projecting lugs 5, upon which the ends of the bow-springs H rest, and the center portions of these bow-springs are received into the jaws 6 upon the disk E, and the bow-springs are clamped into these jaws by a suitable set-screw, and we remark that any desired number of leaves may be made use of for these springs H, according to the strength required of the same, and the shape of these bow-springs is such that they draw the sliding stocks F toward the hub D when not otherwise acted upon.

Around the hub D is a sliding cylinder I, having a central hub that is grooved at 7 to receive the fork of a lever or shifting device that slides the cylinder I endwise upon the shaft A, and upon this cylinder I are joint blocks or knuckles 8 for the toggle-arms K, and the outer ends of these toggle-arms are received into recessed blocks 9 on the inner faces of the segmental receivers 4, and each toggle-arm is provided with a screw 10 and nut, by which the length of the toggle-arm may be adjusted and wear compensated.

It will now be understood that the power may be applied to rotate the shaft A, and that a belt may be applied to the rim of the loose wheel C, or if the wheel C is rotated power may be taken from the same to revolve the shaft A. In either instance when the parts are to be connected by the friction-clutch the cylinder I is slid longitudinally of the shaft to cause the toggle-arms K to move the sliding stocks F outwardly and bring the lignum-vitæ friction-shoes G forcibly into contact with the interior surface of the cylindrical rim 2, and thereby motion will be communicated from one part to the other, and when the sliding cylinder I is moved away from the loose wheel C the bow-springs H act upon the sliding stocks F, moving them toward the shaft A and withdrawing the friction shoes or blocks from contact with the interior surface of the cylindrical rim 2, and thereby separating the connection with the revolving portion of the clutch, and these parts are easily constructed, very durable, and can be repaired with facility whenever necessary, and we find in practice that the lignum-vitæ blocks are not liable to become injured, and they are more durable than any other material.

We claim as our invention—

1. The combination, with the shaft A, collar B, and loose wheel C, of the hub D and disk E, having guide-ribs upon the same, the sliding stocks F, and friction blocks or shoes and the bow-springs H, lugs 5, upon which the bow-springs rest, and the jaws 6 upon the disk E, for receiving the central portions of the bow-springs, substantially as set forth.

2. The combination, with the sliding cylinder I, toggle-arms, stocks F, and segmental receivers 4, of the friction-blocks G of lignum-vitæ, the bow-springs H, disk E, for supporting the bow-springs and the stocks, and the loose wheel C, having a cylindrical rim 2, substantially as specified.

Signed by us this 29th day of October, 1889.

JOHN J. HAYES.
O. S. FELCH.

Witnesses:
LUTHER G. CORINTH,
WM. E. VAN VELSOR.